(12) United States Patent
Barrus et al.

(10) Patent No.: US 9,870,352 B2
(45) Date of Patent: Jan. 16, 2018

(54) CREATING A DASHBOARD FOR TRACKING A WORKFLOW PROCESS INVOLVING HANDWRITTEN FORMS

(71) Applicants: John W. Barrus, Menlo Park, CA (US); Edward L. Schwartz, Menlo Park, CA (US); Michael J. Gormish, Redwood City, CA (US)

(72) Inventors: John W. Barrus, Menlo Park, CA (US); Edward L. Schwartz, Menlo Park, CA (US); Michael J. Gormish, Redwood City, CA (US)

(73) Assignee: Ricoh Company, Ltd., Tokyo (JP)

( * ) Notice: Subject to any disclaimer, the term of this patent is extended or adjusted under 35 U.S.C. 154(b) by 567 days.

(21) Appl. No.: 13/789,663

(22) Filed: Mar. 7, 2013

(65) Prior Publication Data
US 2014/0258826 A1  Sep. 11, 2014

(51) Int. Cl.
*G06F 17/24*  (2006.01)
*G06Q 10/06*  (2012.01)

(52) U.S. Cl.
CPC ....... *G06F 17/243* (2013.01); *G06Q 10/0633* (2013.01)

(58) Field of Classification Search
CPC ...... G06F 17/243; G06F 17/2247; G06F 8/34; G06F 8/38; G06Q 10/0633
USPC ........................................................ 715/224
See application file for complete search history.

(56) References Cited

U.S. PATENT DOCUMENTS

| 8,032,822 | B1 * | 10/2011 | Artamonov | G06Q 20/207 704/9 |
| 8,595,047 | B2 * | 11/2013 | Bukovec | 705/7.26 |
| 8,645,854 | B2 * | 2/2014 | Kopycinski | G06Q 10/10 709/223 |
| 2004/0003353 | A1 * | 1/2004 | Rivera et al. | 715/530 |
| 2004/0268225 | A1 * | 12/2004 | Walsh et al. | 715/501.1 |
| 2006/0089866 | A1 * | 4/2006 | Cheng et al. | 705/8 |
| 2007/0009158 | A1 * | 1/2007 | Geva et al. | 382/209 |
| 2008/0027781 | A1 * | 1/2008 | vom Scheidt et al. | 705/8 |
| 2009/0183063 | A1 * | 7/2009 | Malkin et al. | 715/222 |
| 2010/0011280 | A1 * | 1/2010 | Cheeniyil et al. | 715/223 |
| 2010/0146427 | A1 * | 6/2010 | Schubert | 715/771 |
| 2011/0119102 | A1 * | 5/2011 | Horn et al. | 705/7.13 |

(Continued)

FOREIGN PATENT DOCUMENTS

EP   1696375 A1 *  8/2006  ............. G06Q 10/10

OTHER PUBLICATIONS

Atlassian, JIRA Dashboard, retrieved https://confluence.atlassian.com/display/JIRA/Customizing+the+Dashboard on May 29, 2014, 9 pages.

*Primary Examiner* — Wilson Tsui
(74) *Attorney, Agent, or Firm* — Patent Law Works LLP

(57) ABSTRACT

An electronic writing solution server includes a workflow dashboard application that comprises a dashboard generator. The dashboard generator receives a collection of forms, each form in the collection being of a same type and having been created from a dashboard template, the dashboard template including an association of fields, steps and indicators in each form, identifies which fields have been filled in by at least one user for each form, determines a current step of a multistep workflow based on the fields that have been filled out for each form and generates a dashboard for displaying a number of forms that correspond to each step.

20 Claims, 10 Drawing Sheets

(56) References Cited

U.S. PATENT DOCUMENTS

2012/0054592 A1* 3/2012 Jaffe et al. .................... 715/224
2014/0149470 A1* 5/2014 Rawal .......................... 707/812

* cited by examiner

300

XYZ  Expense Report

| Employee: | Date: |
|---|---|
| Email: | Dept. ▼ |
| Purpose: | |

| Receipted Items Worksheet |||
|---|---|---|
| Expense Category | Descriptions | Amount |
| ▼ | | |
| ▼ | | |
| ▼ | | |
| ▼ | | |

| Per Diem Worksheet ||||
|---|---|---|---|
| Destination | Rate | Days | Amount |
| | ▼ | | |

| Mileage Worksheet ||||
|---|---|---|---|
| Destination | Rate/Mile | Num. of Miles | Amount |
| | | 0.55 | |
| | | 0.55 | |

Total: ____

Authorizing Signatures:

302 — Employee: ____

304 — Manager: ____

306 — Accounting: ____        *XYZ company, inc.*

Figure 3

| Open Close Preferences Blank Form Exit |
| Dashboard | FORMS |

The following 11 forms are waiting for employees' inputs.

| No. | Date | Email | Dept | Total |
|---|---|---|---|---|
| 1 | 11 Dec 2012 | | HR | |
| 2 | 12/7/2012 | | | 100 |
| 3 | Dec 7 2012 | mike@fake.com | | 1080.00 |
| 4 | December 1, 2012 | roy@email.com | AR | |
| 5 | 5 Dec 2012 | | IT | |
| 6 | 7 Dec 2012 | charlie@mm.com | billing | |
| 7 | 6 Dec 2012 | jazz@example.com | | 308.5 |

Figure 9A

CREATING A DASHBOARD FOR TRACKING A WORKFLOW PROCESS INVOLVING HANDWRITTEN FORMS

BACKGROUND OF THE INVENTION

1. Field of the Invention

The specification relates to processing of forms. In particular, the specification relates to creating a dashboard for a collection of forms to determine a current step of a multistep workflow for each form in the collection.

2. Description of the Background Art

Businesses can use software to track workflows. For example, a manager in a large store wants to know the status of purchase requisitions to track productivity and avoid customer dissatisfaction. Many businesses use paper forms or electronic forms to track workflows. Because using paper to track workflows is inefficient and inaccurate, some companies with large internet technology departments can provide electronic systems to support their most important processes, providing an electronic alternative to paper-based systems. However, even large companies are very slow at converting all of their paper processes because of the expense for both the conversion and the management of electronic forms.

Electronic forms are managed using an input system, including testing and validation, business logic, a custom database and some reporting or tracking system. Perhaps the most expensive part of the electronic systems is the training of employees to use new electronic systems. These systems are typically created and maintained by highly skilled employees. It is possible to do some of these things on a smaller scale using programs like FileMaker Pro or Bento from FileMaker® to support workflows. However, the installation and maintenance of the software and tools has to be managed by someone knowledgeable in computer hardware and software.

SUMMARY OF THE INVENTION

The disclosure overcomes the deficiencies of the prior art with a system for creating a dashboard for a collection of forms to determine a current step of a multistep workflow for each form in the collection. In one embodiment, an electronic writing solution server includes a workflow dashboard application comprising a dashboard generator. The dashboard generator receives a collection of forms, each form in the collection being of a same type and having been created from a dashboard template, the dashboard template including an association of fields, steps and indicators in each form, identifies which fields have been filled in by at least one user for each form, determines a current step of a multistep workflow based on the fields that have been filled out for each form and generates a dashboard for displaying a number of forms that correspond to each step. In some embodiments, multiple steps are grouped into a category and the dashboard displays categories.

Other aspects include corresponding methods, systems, apparatuses, and computer program products for these and other innovative aspects.

The system advantageously creates a dashboard to track the status of forms in a workflow process. The visual view of the dashboard allows a user to easily track every step in a multistep workflow. As a result, the users can be more organized and save money and time and identify problems at an early stage. The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 3 is a graphic representation of an example expense report form.

FIG. 9A is a graphic representation of an example table generated in response to receiving a user selection of a step in FIG. 8.

DETAILED DESCRIPTION OF THE PREFERRED EMBODIMENTS

Figure 1:
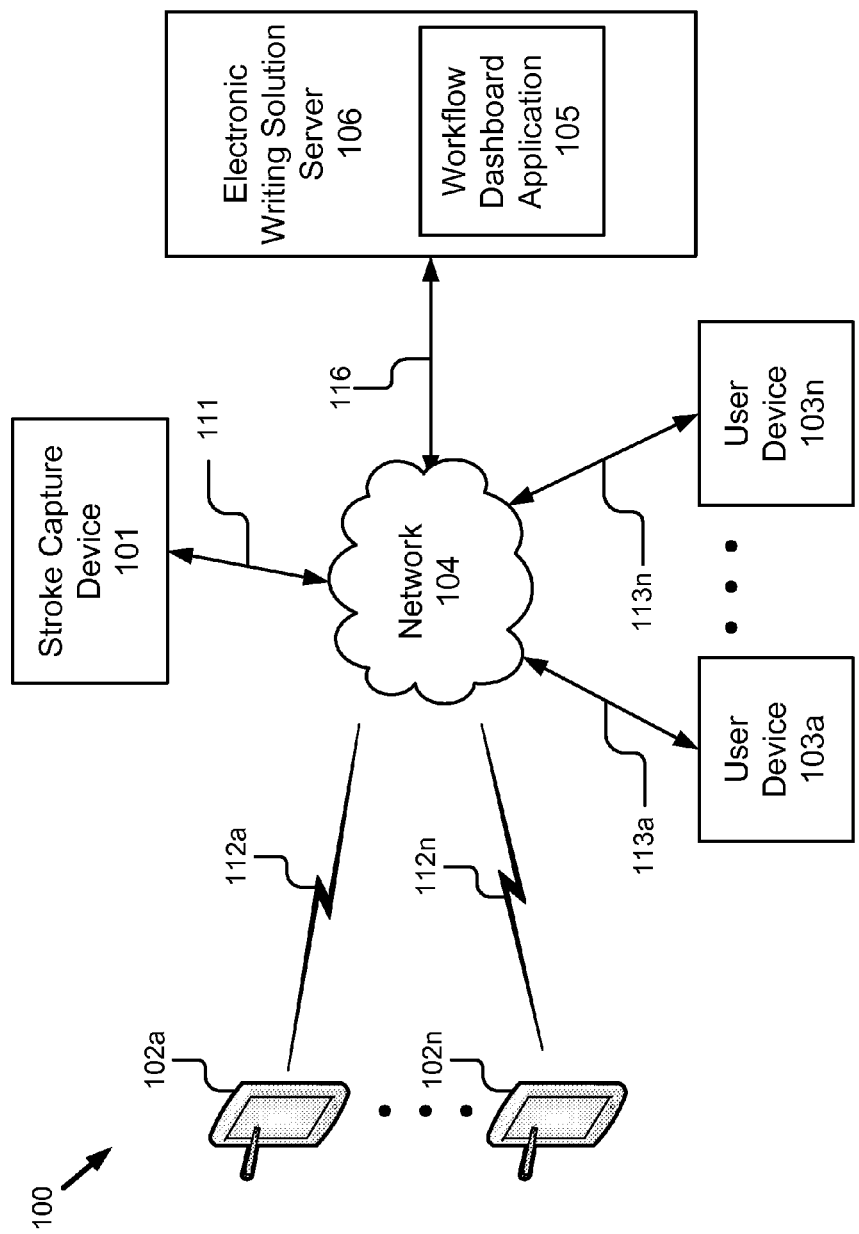
FIG. 1 is a high-level block diagram illustrating one embodiment of a system for creating a dashboard for a collection of forms to determine a current step of a multistep workflow for each form in the collection.

A description of a system and method for creating a dashboard for a collection of forms to determine a current step of a multistep workflow for each form in the collection follows. For purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for creating a dashboard for a collection of forms to determine a current step of a multistep workflow for each form in the collection according to one embodiment. The system 100 includes a capture device 101, portable computing devices 102*a*-102*n*, user devices 103*a*-103*n* and an electronic writing solution server 106 that are each communicatively coupled to the network 104. In FIG. 1 and the remaining figures, a letter after a reference number, such as "102*a*" is a reference to the element having that particular reference number. A reference number in the text without a following letter, such as "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. While only one network 104 is coupled to the plurality of user devices 103*a*-103*n*, the plurality of portable computing devices 102*a*-102*n* and the electronic writing solution server 106, in practice any number of networks 104 can be connected to the entities.

The portable computing devices 102*a*-102*n* are each wirelessly coupled to the network 104 via signal lines 112*a*-112*n* respectively. The portable computing device 102 is any computing device including a memory, a processor and wireless communication capability. For example, the portable computing device 102 can be a tablet computer, a personal digital assistant, a smart phone, etc. The portable computing device 102 is adapted to receive forms, add stroke annotation to the forms and send the annotated forms to the electronic writing solution server 106. A form is any document that includes fields (e.g., blank spaces) for insertion of requested information. The form when filled out with the requested information may be a statement, an order, a request, etc. For example, a form can be a tax form, an insurance form, a medical form, an electronic check, a job application, a survey, a receipt, etc.

In one embodiment, the portable computing device 102 is a tablet computer including a computing pad and a stylus. The computing pad is adapted to display a form image that includes strokes. The strokes are written on the form image using a stylus or a fingertip by a user. The strokes are typically displayed on top of the image, just as if written by pen on paper. The computing pad usually receives the strokes as a sequence of points or segments along with location, timing and pressure information. The computing pad sends the form images in any image format known to persons of ordinary skill in the art, for example, a Scalable Vector Graphics (SVG) file format, which can contain both strokes and images. In one embodiment, the computing pad attaches the information associated with the strokes, for example, the location and timing information with the form images as metadata. The portable computing device 102 determines its physical location by using global positioning system (GPS) circuitry or accessing a database including media access control (MAC) addresses. In one embodiment, the strokes are saved in a format known to any person of ordinary skill in the art, including SVG or Ink Markup Language (InkML).

The capture device 101 is coupled to the network 104 via signal line 111. The capture device 101 is adapted to capture a form that includes strokes and send the form to the electronic writing solution server 106. For example, the capture device 101 is a camera or a scanner that captures the image of a printed form.

The user devices 103*a*-103*n* are each coupled to the network 104 via the signal lines 113*a*-113*n* respectively. The user device 103 is any computing device that includes a memory and a processor, for example, a desktop computer, a laptop computer, etc. The user device 103 is adapted to send and receive data to and from the electronic writing solution server 106. For example, the user device 103 sends a request to the electronic writing solution server 106 to load a form and receives the form from the electronic writing solution server 106. The user device 103 is accessed by users that have permission to access information from the electronic writing solution server 106, such as a creator of the form sent to portable computing devices 102 or an administrator of the electronic writing solution server 106.

The electronic writing solution server 106 is any computing device including a memory and a processor and is coupled to the network 104 via signal line 116. The electronic writing solution server 106 includes a workflow dashboard application 105. The workflow dashboard application 105 receives a collection of forms, determines a current step of a multistep workflow for each form based on a dashboard template associated with each form, categorizes each form based on the current step and generates a dashboard to display step information for each form. The workflow dashboard application 105 is described in further detail below with reference to FIG. 2.

Electronic Writing Solution Server 106

Figure 2:
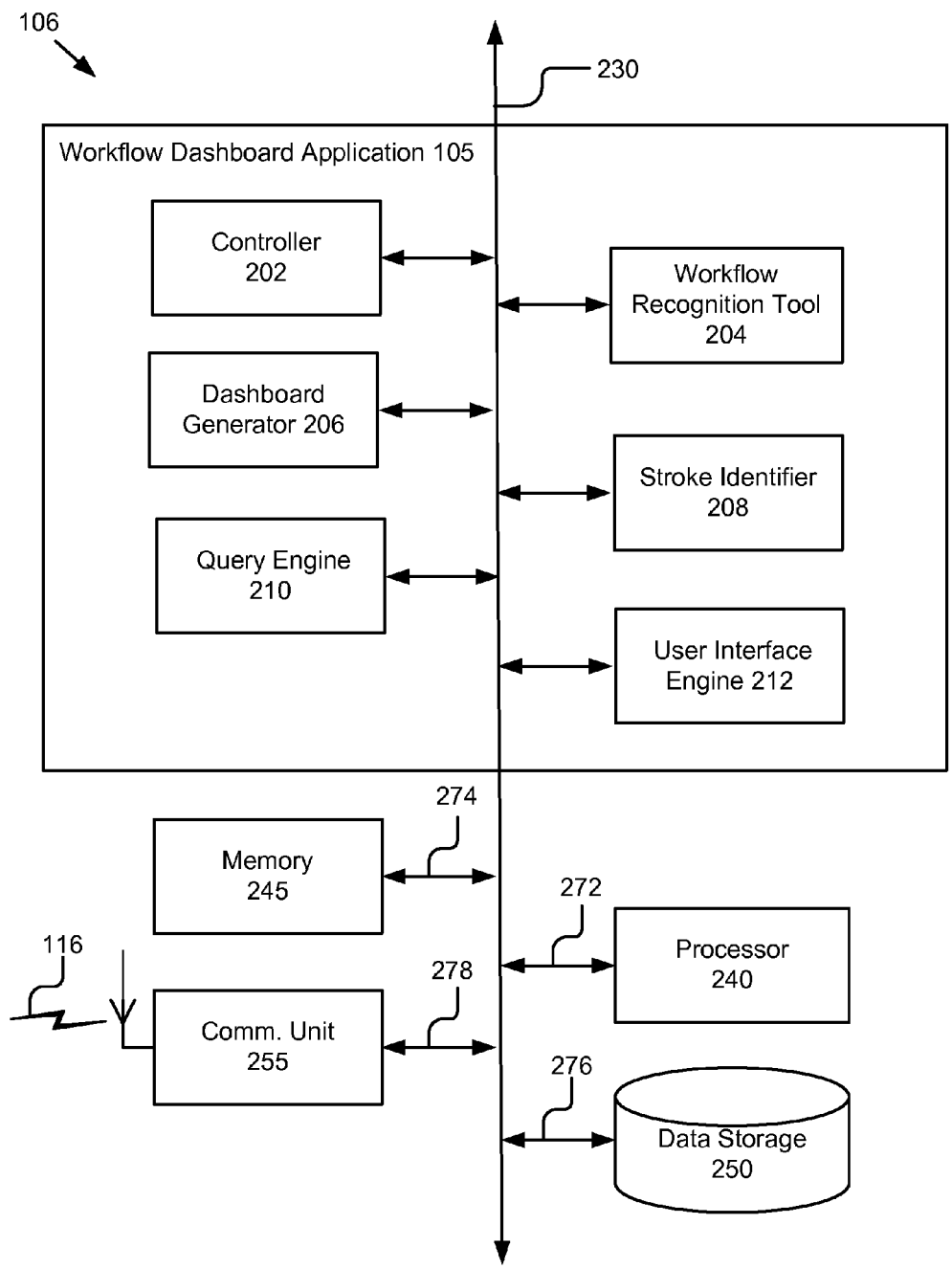
FIG. 2 is a block diagram illustrating one embodiment of a workflow dashboard application in more detail.

Referring now to FIG. 2, the workflow dashboard application 105 is shown in more detail. FIG. 2 is a block diagram of the electronic writing solution server 106 that includes a processor 240, a memory 245, a communication unit 255, data storage 250 and the workflow dashboard application 105.

The processor 240, the memory 245, the communication unit 255 and the data storage 250 are communicatively coupled to the bus 230. The bus 230 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations. The processor 240 is coupled to the bus 230 for communication with the other components via signal line 272. Processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 230 for communication with the other components via signal line 274. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 255 is hardware for receiving and transmitting data by linking the processor 240 to the network 104 and other processing systems. The communication unit 255 receives user inputs such as stroke data for a form from the portable computing device 102 or the user device 103 and transmits the data to the workflow dashboard application 105 for further processing. The communication unit 255 also transmits data to the user device 103, for example, a table including information about forms that are in a particular step of a multistep workflow. The communication unit 255 is coupled to the bus 230 via signal line 278.

In one embodiment, the communication unit 255 includes a port for direct physical connection to the user device 103, the portable computing device 102 or to another communication channel. For example, the communication unit 255 includes an RJ45 port or similar port for wired communication with the user device 103. In another embodiment, the communication unit 255 includes a wireless transceiver 116 for exchanging data with the user device 103, the portable computing device 102 or any other communication channel using one or more wireless communication methods, such as IEEE 802.11, IEEE 802.16, Bluetooth® or another suitable wireless communication method.

In yet another embodiment, the communication unit 255 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 255 includes a wired port and a wireless transceiver. The communication unit 255 also provides other conventional connections to the network 104 for distribution of files and/or media objects using standard network protocols such as TCP/IP, HTTP, HTTPS and SMTP as will be understood to those skilled in the art.

The data storage 250 is a non-transitory memory that stores instructions and/or data used for creating a dashboard for a collection of forms to determine a current step of a multistep workflow for each form in the collection. For example, the data storage 250 stores a collection of forms, a dashboard template associated with each form and a dashboard created for the forms. The data storage 250 is coupled to the bus 230 for communication with the other components via signal line 276.

In one embodiment, the workflow dashboard application 105 includes a controller 202, a workflow recognition tool 204, a dashboard generator 206, a stroke identifier 208, a query engine 210 and a user interface engine 212.

The controller 202 is software and routines for receiving data via the communication unit 255, routing the data to appropriate components of the workflow dashboard application 105 and transmitting responses from the components of the workflow dashboard application 105 to the communication unit 255 for transmitting to the user device 103 and other components of the system 100. In one embodiment, the controller 202 is a set of instructions executable by the processor 240 to provide the functionality described below for managing data transfer between the components of the electronic writing solution server 106 and other components of the system 100. In another embodiment, the controller 202 is stored in the memory 245 and is accessible and executable by the processor 240. In either embodiment, the controller 202 is adapted for cooperation and communication with the processor 240, the communication unit 255 and other components of the electronic writing solution server 106.

The workflow recognition tool 204 is software and routines for defining a workflow and creating a dashboard template associated with a workflow for a form. In one embodiment, the workflow recognition tool 204 is a set of instructions executable by the processor 240 to provide the functionality described below for defining a workflow and creating a dashboard template associated with a workflow for a form. In another embodiment, the workflow recognition tool 204 is stored in the memory 245 and is accessible and executable by the processor 240. In either embodiment, the workflow recognition tool 204 is adapted for cooperation and communication with the processor 240, the communication unit 255 and other components of the electronic writing solution server 106.

The workflow recognition tool 204 receives a form via the controller 202, receives user input for determining a multistep workflow for processing the form, receives user input for identifying at least one field in the form that is associated with a step in the multistep workflow and creates a dashboard template associated with the workflow for the form based on the defined multistep workflow and the associated fields.

The workflow recognition tool 204 receives a form with one or more pages. The form includes a set of fields. FIG. 3 is a graphic representation of an example expense report form. In this example, the one-page expense report form 300 is filled out by three different groups: an employee requesting reimbursement, a manager approving the request and a person from accounting that approves the request. The form 300 includes 31 fields such as an employee field (e.g., a name field), a date field, an email field, a dept. field, a purpose field, expense category fields, description fields, amount fields, a total field, signature fields, etc. The signature fields include a field 302 for receiving the employee's signature, a field 304 for receiving a manager's signature and a field 306 for receiving a signature from someone in the accounting department.

In one embodiment, the workflow recognition tool 204 receives a form associated with a form identifier and determines what fields are included in the form from the form identifier. In this embodiment, the form identifier is associated with a list of fields in the form. The form identifier may be a bar code, a watermark or machine-readable text when the form is received as an image. For example, the form identifier may be one or more blank form images, one or more checksums of blank form images, a URL or a universally unique identifier (UUID) when the form is received in a digital format. In another embodiment, a user specifies which fields are in the form after the form is retrieved.

For example, the workflow recognition tool 204 determines from the form identifier associated with the form 300 shown in FIG. 3 that the form 300 is an expense report form and includes 31 fields. In another embodiment, the workflow recognition tool 204 receives a form, analyzes pixels in one or more positions of the form and matches the pixels in the one or more positions with pixels in a plurality of forms stored in a database. The workflow recognition tool 204 determines what fields are included in the form from the matched form in the database. For example, the workflow recognition tool 204 receives a form, matches the form to a visitor registration form stored in a database and determines that the form includes eight fields (e.g., a name field, a company name, a signature field, etc.) from the visitor registration form.

Once the workflow recognition tool 204 receives a form and recognizes the fields included in the form, the workflow recognition tool 204 receives user input defining a multistep workflow for processing the form. In FIG. 3, the workflow recognition tool 204 determines the multistep workflow for processing the form 300 to reimburse an employee. The workflow recognition tool 204 determines that the workflow for processing the form 300 includes five steps: 1) the form was opened; 2) the employee filled out the form; 3) the employee signed the form; 4) the manager signed the form; and 5) a person in accounting signed the form. In the first step, the employee opens the form 300 on a portable computing device such as a tablet or a smartphone. In the second step, the employee fills out all fields except the signature field in the form 300. The employee fills out fields such as the name field, the date field, the expense category fields, etc. In the third step, the employee signs the employee signature field 302. In the fourth step, a manager signs in the manager signature field 304 to indicate management approval to the form 300 filled out by the employee. In the fifth step, a person in accounting signs in the accounting signature field 306 to indicate budget approval for the form 300 filled out by the employee. In another example, steps 2 and 3 are combined into a single step of the employee filling out all the form including the signature field to create a workflow with four steps.

The workflow recognition tool 204 receives user input defining fields in the form that are associated with each step in the multistep workflow. In FIG. 3, an employee can fill out the form 300 by inputting information in 29 fields out of the 31 fields (i.e., all fields except the manager signature fields 304 and the accounting signature 306). The workflow recognition tool 204 or the user determines which fields in the 29 fields are optional for completing the second step and which fields in the 29 fields are needed to complete the second step. For example, the workflow recognition tool 204 determines two fields, e.g., the employee name field and the date field are required to complete the second step. The employee filling step is completed as long as the employee has inputted information in the two fields. For the third step, the employee signature field 302 is required.

The workflow recognition tool 204 instructs the user interface engine 212 to generate graphical data for highlighting the at least one field associated with the step using an indicator. The indicator can have different types of borders or regions. The borders can be different types of lines or differently colored lines. The regions could be shaded in different colors. Persons or ordinary skill in the art will understand that other types of indicators are possible. Continuing with the example corresponding to FIG. 3, the fields to be completed by an employee (except the signature field) are displayed in blue, the signature field to be completed by the employee is displayed in red, the signature field to be completed by the manager is displayed in green and the signature field to be completed by accounting is displayed in yellow. In some embodiments, instead of highlighting each individual field, the workflow recognition tool 204 instructs the user interface engine 212 to group all the fields associated with a single step and highlight the outside of the fields.

In one embodiment, the workflow recognition tool 204 receives user input for associating each step in the multistep workflow with at least one field in the form. In another embodiment, the workflow recognition tool 204 associates a subset of steps in the multistep workflow with fields in the form. For example, the workflow recognition tool 204 determines a five-step workflow for processing the expense report form 300 shown in FIG. 3. The first step is opening the form, which is independent of the fields in the form.

In one embodiment, the workflow recognition tool 204 saves the steps of the multistep workflow, the fields associated with the steps, the indicators used to highlight the fields and the association between the steps, the fields and the indicators as a dashboard template of the form. In one embodiment, the workflow recognition tool 204 stores the dashboard template of the form in the data storage 250. In another embodiment, the workflow recognition tool 204 also transmits the dashboard template to the dashboard generator 206.

Figure 4:
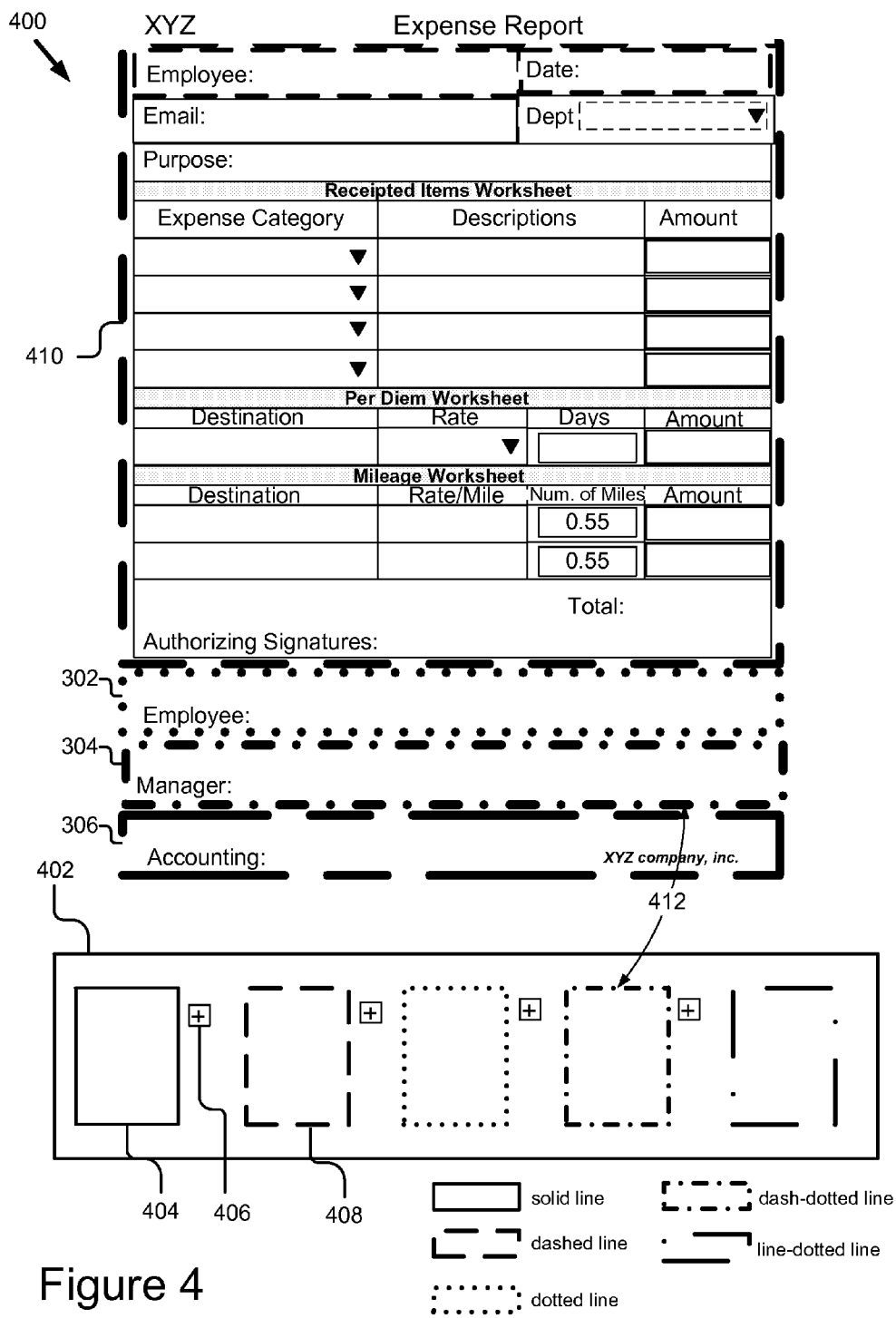
FIG. 4 is a graphic representation that illustrates the generation of a dashboard template for the expense report form shown in FIG. 3.

FIG. 4 is a graphical representation 400 that illustrates the generation of a dashboard template for the expense report form 300 shown in FIG. 3. The workflow recognition tool 204 receives the form 300 and recognizes the fields included in the form 300. The workflow recognition tool 204 determines a multistep workflow for processing the form 300 to reimburse an employee. The workflow recognition tool 204 adds steps of the multistep workflow to a region 402 and uses indicators to represent each step in the region 402. The workflow recognition tool 204 determines the first step in the multistep workflow and represents the first step with a solid indicator 404. The workflow recognition tool 204 defines the first step as being associated with a particular action, in this case opening the form.

The workflow recognition tool 204 then determines the second step in the multistep workflow. There are many different ways that the second step and remaining steps can be initiated. For example, the workflow recognition tool 204 receives a selection of the "+" sign 406 to open a dashed line indicator 408 that represents the second step. In another embodiment, the workflow recognition tool 204 could receive a selection of indicators 404 and 408. Persons of ordinary skill in the art will understand that there are many different ways to indicate the selection of a next step. In this case, the workflow recognition tool 204 associates 28 of the fields with the second step. For example, a user selects the "+" sign 406 to create the new step and then clicks on various fields in the form to associate those fields with the step. The workflow recognition tool 204 highlights the fields in the form with the same indicator included in the region 406. For example, the employee fields (except the signature field) 410 are highlighted with a dashed line that matches the dashed line indicator 408.

Similarly, the workflow recognition tool 204 determines other steps in the multistep workflow and receives a selection from the user of the "+" sign to open different indicators to represent the other steps. In the region 402, the workflow recognition tool 204 determines a five-step workflow for the form 300. In addition to representing the first and second steps in the solid line indicator 404 and the dashed line indicator 408, respectively, the workflow recognition tool 204 represents the third step with a dotted line indicator, the fourth step with a dash-dotted line indicator and the fifth step with a line-dotted line indicator.

In another embodiment, the workflow recognition tool 204 first generates the indicators, then the workflow recognition tool 204 associates steps and fields with the indicators. For example, the workflow recognition tool 204 associates four steps in the five-step workflow, e.g., the second step, the third step, the fourth step, and the fifth step with fields in the form 300. The workflow recognition tool 204 determines that the second step in the multistep workflow is that an employee fills out the form 300. The workflow recognition tool 204 identifies that two fields including the employee name and the date field are non-optional for completing the second step, and associates the two fields with the second step. The workflow recognition tool 204 highlights the employee fields using the indicator representing the second step, e.g., a dashed line indicator 408. The workflow recognition tool 204 also determines that a section 410 including the two required fields is associated with the second step. The workflow recognition tool 204 associates the entire section of employee fields (except the signature field) with the second step by highlighting the section 410 with a dashed line that matches the dashed line indicator 408 in the region 402. Similarly, the workflow recognition tool 204 identifies the fields associated with the third step, the fourth step and the fifth step, and associates the fields with the steps by highlighting the fields with the indicator that represents the corresponding step. For example, the workflow recognition tool 204 identifies that the signature field 306 for receiving the accounting management's signature is associated with the fifth step, and highlights the field 306 with a line-dotted line. The workflow recognition tool 204 establishes the association 412 between the field 304 and the fourth step by representing them with the same indicator, e.g., a dash-dotted line.

The dashboard generator 206 is software and routines for generating a dashboard for a collection of forms associated with a dashboard template. In one embodiment, the dashboard generator 206 is a set of instructions executable by the processor 240 to provide the functionality described below for generating a dashboard for a collection of forms associated with a dashboard template. In another embodiment, the dashboard generator 206 is stored in the memory 245 and is accessible and executable by the processor 240. In either embodiment, the dashboard generator 206 is adapted for cooperation and communication with the processor 240, the communication unit 255 and other components of the electronic writing solution server 106.

The dashboard generator 206 receives a collection of forms, determines a current step of a multistep workflow for each form in the collection and generates a dashboard for displaying the steps.

The collection of forms includes forms that are of a same type and have been created from a dashboard template. Forms of the same type include the same or similar fields, for example, delivery report forms, expense report forms, etc. The dashboard template includes an association of steps, fields and indicators in a form. The workflow recognition tool 204 determines the steps in a multistep workflow for processing the form, identifies the fields associated with the steps, highlights the fields using the indicators and stores the association of the steps, the fields and the indicators in the dashboard template. For example, the dashboard generator 206 receives a collection of 40 delivery report forms. Each form is associated with a dashboard template. The workflow recognition tool 204 determines three steps, e.g., a description of the package, information for receiving the package at the shipping office and a signature for the delivery of the package, for processing the delivery report form. The workflow recognition tool 204 also determines fields in the delivery report form that are associated with the three steps. For instance, the workflow recognition tool 204 determines that three fields for receiving the content of a package, a sender's address and a recipient's address are associated with the first receiving step, two fields for receiving a name of a destination agent and a time that the destination agent sends out the package are associated with the second shipping step, and a field for receiving the recipient's signature is associated with the third delivering step. The workflow recognition tool 204 highlights the fields associated with the three steps using three indicators (e.g., red, yellow and blue boxes). The workflow recognition tool 204 stores the association between the steps, the fields and the indicators in the dashboard template.

The dashboard generator 206 identifies which fields have been filled in by at least one user for each form in the collection. In one embodiment, the dashboard generator 206 identifies a bounding box used to receive user inputs for a field in a form and determines if there is any user input in the bounding box. The dashboard generator 206 identifies that a field has been filled in by a user based on determining that the bounding box associated with the field is not empty.

In response to identifying the fields that have been filled out for each form, the dashboard generator 206 determines a current step of the multistep workflow that each form is in. In one embodiment, the dashboard generator 206 determines a current step based on the identification of fields associated with a step in the multistep workflow. If the dashboard generator 206 determines that a subset of the fields associated with a step have been filled out for a form, the dashboard generator 206 determines that this step is the current step of the form. If the dashboard generator 206 determines that all the fields associated with a step have been filled out for a form (or the required fields associated with the step if optional steps were also defined), the dashboard generator 206 determines that the step is completed and the next step in the multistep workflow is the current step of the form. Continuing with the above example, the dashboard generator 206 identifies which fields have been filled out for each of 40 delivery report forms. For the first form, the dashboard generator 206 identifies the field for receiving a name of a destination agent has been filled out and determines that the current step of the first form is the second shipping step. For the second form, the dashboard generator 206 identifies both the field for receiving a destination agent's name and the field for receiving the time that the destination agent sends out a package have been filled out. Since the two fields associated with the second shipping step are all filled out, the dashboard generator 206 determines that the second step is completed and the current step for the second step is the third delivering step. Similarly, the dashboard generator 206 determines the current step for other 38 delivery report forms in the collection.

The dashboard generator 206 keeps a form at the lowest step that is waiting for an action. For example, in the expense report example, even if a manager signed the form, if the employee does not sign the form, that form is still at step three. This imposes a sense of order on the multistep workflow.

In another embodiment, the dashboard generator 206 determines the current step by receiving a message at each step from the portable computing device 102. For example, the portable computing device 102 sends an email to the dashboard generator 206 when an employee opens the form or submits the signed form to the manager, when the manager submits the signed form to the accounting department and when a person in the accounting department signs the form.

In some embodiments, the dashboard generator 206 determines categories for the steps for each form. The categories are best used when there are too many steps to fit nicely on the user interface, the dashboard generator 206 can associate multiple steps with a single category. For example, where the workflow is for a city to manage a variety of building projects, the first category is called "preliminary." The first step is for projects that are in the bidding steps where contractors provide bids for creating the building, architects provide bids for creating a design for the buildings, etc. The second step is for projects where the town is determining how to secure money to pay for the project, for example, by voting on a bond. The third step is for confirming that the selected contractor and the funding are secured. The next category is for the building process, which is divided into multiple steps for viewing the architectural plans, demolition of the original site, preparation of the skeleton of the building, completion of the building and furnishing of the building. The last category is for identifying older buildings for renovation projects.

The dashboard generator 206 generates a dashboard for displaying a number of forms that correspond to each step or category. For example, the dashboard generator 206 categorizes each of the 40 delivery report forms into one of three steps and generates a dashboard for displaying the number of forms in each of the three steps. For instances, the dashboard generator 206 generates a dashboard for displaying 18 forms in the first step, 10 forms in the second step and 12 forms in the third step. In one embodiment, the dashboard generator 206 communicates with the user interface engine 212 to provide a visual representation of the dashboard. The visual representation includes the number of forms in each step or category. The visual representation will be depicted in FIG. 8 and described in greater detail below. In another embodiment, the dashboard generator 206 also communicates with a notification module (not shown) to send notifications (e.g., email, text message) to one or more users who track the workflow process. In one example, the dashboard generator 206 notifies the employee who filled out the expense report form 300 in FIG. 3 about the progress of processing his or her form. In another example, the dashboard generator 206 notifies a manager who is responsible for signing the field 304 in the expense report form 300 in FIG. 3 about how many forms are waiting for his or her signature. This could be a weekly reminder or based on a threshold time, such as when each form has been at a certain stage for over a week.

In one embodiment, the dashboard generator 206 also provides statistics about the multistep workflow. For example, the dashboard generator 206 identifies at least approximately when various fields were filled in and when a form went from one stage to another. The dashboard generator 206 then provides information in the dashboard, such as the average number of hours a form has been in a particular stage, the maximum amount of time any form in a step has been in the step and the number of forms that have been in the step longer than the expected time.

The stroke identifier 208 is software and routines for receiving stroke data associated with a form and identifying the position of the stroke data. In one embodiment, the stroke identifier is a set of instructions executable by the processor 240 to provide the functionality described below for receiving stroke data associated with a form and identifying the position of the stroke data. In another embodiment, the stroke identifier 208 is stored in the memory 245 and is accessible and executable by the processor 240. In either embodiment, the stroke identifier 208 is adapted for cooperation and communication with the processor 240, the communication unit 255 and other components of the electronic writing solution server 106.

In one embodiment, the stroke identifier 208 identifies a stroke in a form image by identifying pixels in the form image that represent handwriting strokes. For example, the stroke identifier 208 identifies stroke pixels based on pixel intensities, pixel colors, etc. The stroke identifier 208 then determines a position (e.g., an x-y coordinate) of a stroke in the form. For example, the stroke identifier 208 uses metadata along with a form image to determine the position of each stroke in the form image. The stroke identifier 208 associates a stroke with a field in the form based on the position of the stroke. For example, the stroke identifier 208 identifies a field in a position of the form with a field identifier. Once a stroke in the position is identified, the stroke identifier 208 associates the stroke with the field using the field identifier.

In one embodiment, the stroke identifier 208 receives the completed form data including strokes (e.g. in InkML or other vector format) from the controller 202. The received form data also includes an unmarked blank form image (i.e., an image of the form without any strokes) as metadata. In another embodiment, the stroke identifier 208 generates completed form data for each completed form from an input completed form image by, for example, subtracting the input completed form image with the unmarked blank form image. The stroke identifier 208 then identifies the position of each stroke within the completed form data and compares it to the known location of the fields in the form.

Within this specification, stroke data is captured from forms as a sequence of pixels, points, line segments or curves, optionally including pressure, time and acceleration information associated with the strokes. For convenience, the strokes are frequently converted to images, but the images can include metadata about the strokes, like pressure or time data. The metadata could be included within the image or associated with the image in other ways. Stroke data and image data are frequently used interchangeably to refer to the data captured as strokes on the portable computing device 102.

In one embodiment, the stroke identifier 208 identifies positions of the stroke data in a set of forms and communicates with the query engine 210 to generate a table to include the identified stroke data. For example, the stroke identifier 208 identifies the name "John" in the position of a name field in a first survey form and identifies an empty value in the position of the name field in a second survey form. The stroke identifier 208 communicates with the query engine 210 to generate a table. The table includes two rows representing the two survey forms. The first row includes a cell with the name "John" and the second row includes a cell with an empty value.

The query engine 210 is software and routines for generating a query based on user input associated with a dashboard and running the query. In one embodiment, the query engine 210 is a set of instructions executable by the processor 240 to provide the functionality described below for generating and running a query. In another embodiment, the query engine 210 is stored in the memory 245 and is accessible and executable by the processor 240. In either embodiment, the query engine 210 is adapted for cooperation and communication with the processor 240 and other components of the electronic writing solution server 106.

The dashboard generator 206 generates a dashboard for a collection of forms. The dashboard includes a visual representation of the forms in each step or category of a multistep workflow. The query engine 210 receives an input associated with the dashboard from a user (e.g., an operation in the visual representation) and generates a query in response to receiving the user input. The query engine 210 runs the query, generates a query result and communicates with the user interface engine 212 to provide the query result to the user in the dashboard.

In one embodiment, the query engine 210 receives user input for selecting one of the steps in the multistep workflow and generates a query for all forms corresponding to the selected step. For example, the dashboard generator 206 generates a dashboard for 100 registration forms. The dashboard shows that 25 out of 100 registration forms are in the first step in the multistep workflow. The query engine 210 receives the user's selection of the number "25" shown in the visual representation of the dashboard and generates a query for retrieving information about the 25 forms from a database storing the 100 forms. In one embodiment, the query engine 210 communicates with the stroke identifier 208 to retrieve information from forms corresponding to the selected step (e.g., a position of a field, stroke data inputted in fields) and generate a table to include the retrieved information. For example, the query engine 210 generates field images from the stroke information received from the stroke identifier 208, generates field images for each field in the form, for example, by using an image from the form or generating a symbolic representation of the field. The query engine 210 generates a query result that includes the table and instructs the user interface engine 212 to display the table to the user. A query result including a table is depicted in FIG. 9A and described in greater detail below.

In another embodiment, the query engine 210 receives user input for switching an order between steps or categories in the dashboard and generates a query for updating the steps or categories. For example, the dashboard generator 206 generates a dashboard for 50 forms. The dashboard includes the number of forms in each of four steps, e.g., 10 in the first step, 22 in the second step, 14 in the third step and four in the fourth step. The query engine 210 receives a notification that a user switched the order of the second step and the third step in the user interface, and generates a query to retrieve new number of forms in each step before instructing the user interface engine 212 to generate graphical data for generating the user interface with the new order. The query engine 210 communicates with other components in the workflow dashboard application 105 to run the query. A query result generated by the query engine 210 based on switching an order of categories will be depicted in FIG. 9B and described in greater detail below.

The user interface engine 212 is software and routines for generating graphical data for displaying a user interface. In one embodiment, the user interface engine 212 is a set of instructions executable by the processor 240 to provide the functionality described below for generating the user interface. In another embodiment, the user interface engine 212 is stored in the memory 245 and is accessible and executable by the processor 240. In either embodiment, the user interface engine 212 is adapted for cooperation and communication with the processor 240, the communication unit 255 and other components of the electronic writing solution server 106.

In one embodiment, the user interface engine 212 generates graphical data for displaying a dashboard to a user. For example, the dashboard generator 206 instructs the user interface engine 212 to provide a visual representation of the dashboard to a user. The visual representation includes the number of forms in each step or category. In another embodiment, the user interface engine 212 generates graphical data for receiving user inputs to a dashboard, for example, a selection of a step in the visual representation in the dashboard. In yet another embodiment, the user interface engine 212 generates graphical data for presenting a query result to a user.

Methods

Figure 5:
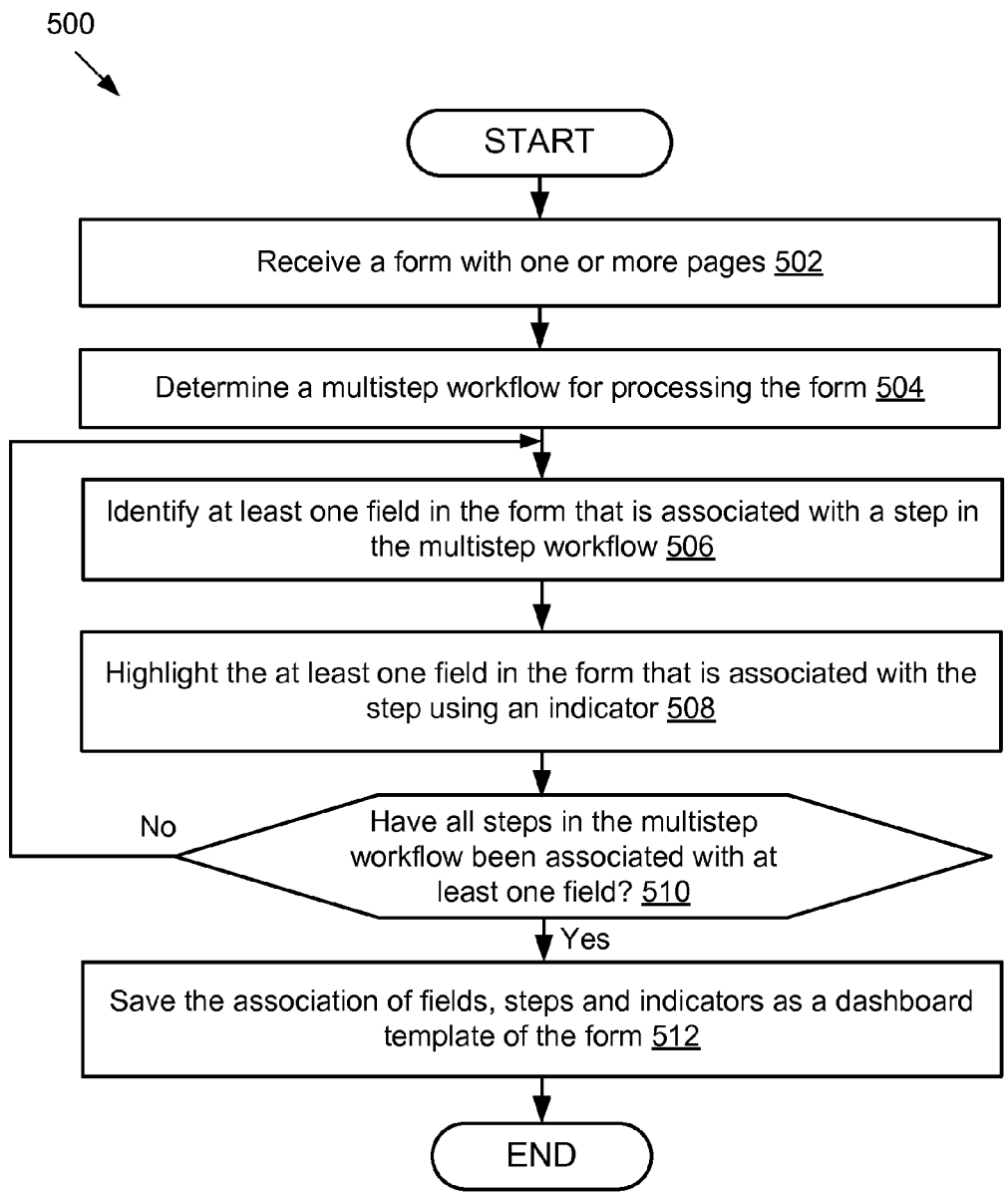
FIG. 5 is a flow diagram of one embodiment of a method for creating a dashboard template associated with a form.
Figure 6:
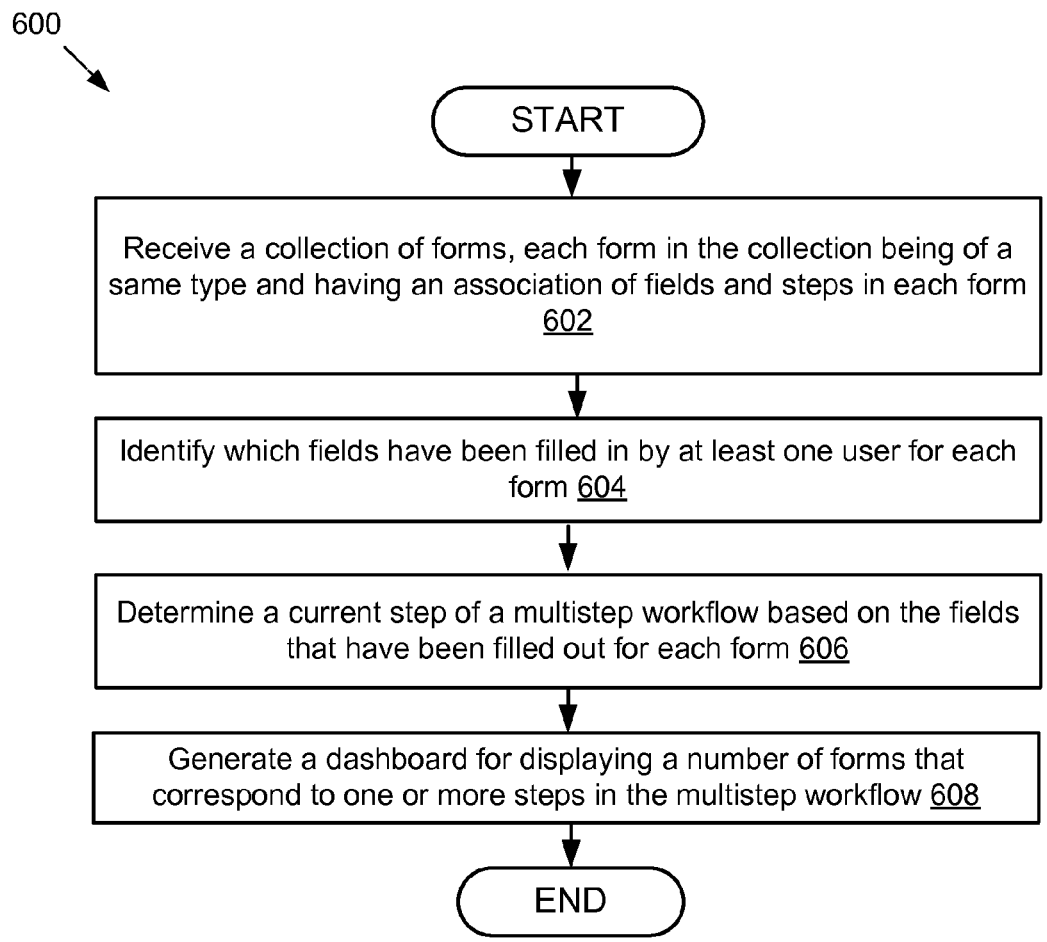
FIG. 6 is a flow diagram of one embodiment of a method for generating a dashboard for a collection of forms associated with a dashboard template.
Figure 7:
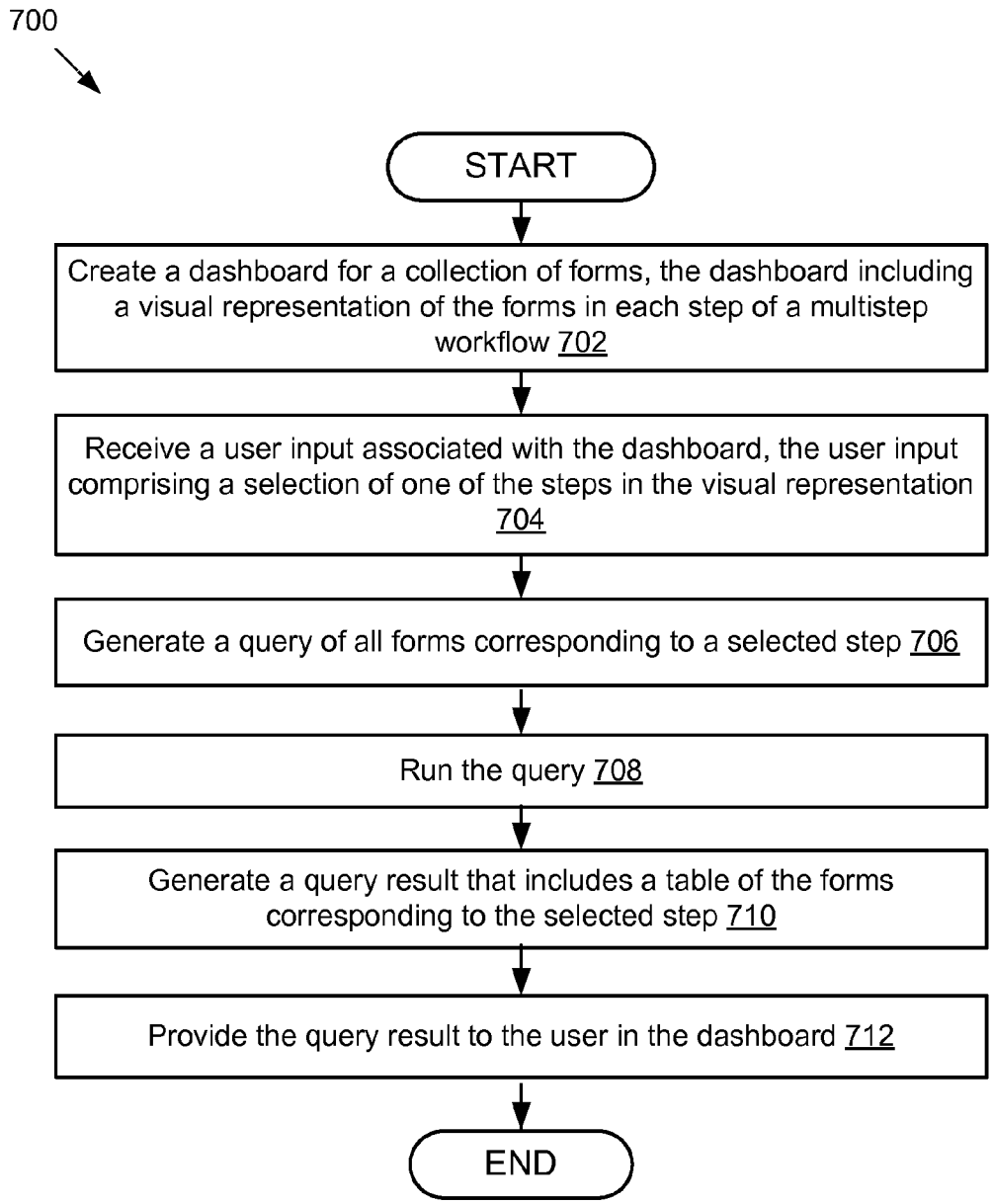
FIG. 7 is a flow diagram of one embodiment of a method for generating a query result in response to receiving user input.

Referring now to FIGS. 5-7, the methods of the invention will be described in more detail. FIG. 5 is a flow diagram 500 that illustrates one embodiment of a method for creating a dashboard template associated with a form. The workflow dashboard application 105 includes a workflow recognition tool 204. The workflow recognition tool 204 receives 502 a form with one or more pages. The workflow recognition tool 204 determines 504 a multistep workflow for processing the form. For example, the workflow recognition tool 204 determines that the workflow for processing the expense report form 300 in FIG. 3 includes five steps: 1) an employee opened the form; 2) the employee filled in the employee portion of the form except the signature (i.e., this is for all the forms waiting for the employee's signature); 3) the employee signed the form (i.e., this is for all the forms waiting for the manager's signature); 4) a manager signed the manager portion of the form (i.e., this is for all the forms waiting for a person from accounting to sign the form); and 5) a person from accounting signed the accounting portion of the form (i.e., the form has been completed filled out). The workflow recognition tool 204 identifies 506 at least one field in the form that is associated with a step in the multistep workflow. For example, for the form 300 in FIG. 3, the workflow recognition tool 204 determines two fields, e.g., the employee name and the date field that are required for the second step. The other fields in the employee section are optional for completing the second step. The workflow recognition tool 204 highlights 508 the at least one field in the form that is associated with the step using an indicator. For example, the workflow recognition tool 204 highlights the two required fields associated with the second step using dashed line indicators as shown in FIG. 4 or color coded boxes.

The workflow recognition tool 204 determines 510 whether all steps in the multistep workflow have been associated with at least one field. In response to determining that one or more steps in the multistep workflow have not been associated with at least one field, the method 500 repeats steps 506 and 508 to associate the one or more steps with at least one field. Otherwise, the method goes to step 512. For example, for the form 300 shown in FIG. 3, the workflow recognition tool 204 also determines the fields associated with the third step, the fourth step and the fifth step. In one embodiment, the workflow recognition tool 204 associates each step in the multistep workflow with at least one field in the form. In another embodiment, the workflow recognition tool 204 associates a subset of steps in the multistep workflow with fields in the form. The workflow recognition tool 204 saves 512 the association of fields, steps and indicators as a dashboard template of the form.

FIG. 6 is a flow diagram 600 that illustrates one embodiment of a method for generating a dashboard for a collection of forms associated with a dashboard template. The workflow dashboard application 105 includes a controller 202, a dashboard generator 206 and a user interface engine 212. The dashboard generator 206 receives 602 a collection of forms via the controller 202, each form in the collection being of a same type and having an association of fields and steps in each form. Forms of the same type include the same or similar fields, for example, delivery report forms, expense report forms, etc. For example, the dashboard generator 206 receives a collection of 40 delivery report forms. Each form is associated with a dashboard template. The dashboard template includes an association of three steps (e.g., a description of the package, information for receiving the package at the shipping office and a signature for the delivery of the package), fields that are associated with the three steps (e.g., two fields for receiving a name of a destination agent and a time that the destination agent sends out the package are associated with the second shipping step) and three indicators (e.g., red, yellow and blue boxes).

The dashboard generator 206 identifies 604 which fields have been filled in by at least one user for each form. In one embodiment, the dashboard generator 206 identifies a bounding box used to receive user inputs for a field in a form and determines if there is any user input in the bounding box. The dashboard generator 206 identifies that a field has been filled in by a user based on determining that the bounding box associated with the field is not empty.

The dashboard generator 206 determines 606 a current step of a multistep workflow based on the fields that have been filled out for each form. In one embodiment, the dashboard generator 206 determines a current step based on the identification of fields associated with a step in the multistep workflow. Continuing with the above example, the dashboard generator 206 identifies the three fields for receiving the content of a package, a sender's address and a recipient's address associated with the first receiving step and one field for receiving a name of a destination agent associated with the second shipping step have been filled out and determines that the current step of the first form is the second shipping step. In another embodiment, when one or more steps in a multistep workflow are not associated with any fields in a form, the dashboard generator 206 determines a current step based on, for example, receiving a notification from the portable computing device 102 associated with the step. For example, the dashboard generator 206 determines that the current step is the first step if no field has been filled out in a form.

The dashboard generator 206 generates 608 a dashboard for displaying a number of forms that correspond to each step. Continuing with the example of delivery report forms, the dashboard generator 206 generates a dashboard for 40 delivery report forms. The dashboard shows 18 forms in the first step, 10 forms in the second step and 12 forms in the third step. The dashboard generator 206 instructs the user interface engine 212 to generate graphical data for displaying the user interface. The user interface engine 212 provides a visual representation in the dashboard via the communication unit 255, the visual representation including the number of forms in one or more steps in the multistep workflow. In one embodiment, the dashboard generator 206 determines categories associated with the steps for each form. For example, where multiple steps can be grouped into the same category, the dashboard generator 206 condenses the steps into categories to simplify the user interfaces.

FIG. 7 is a flow diagram 700 that illustrates one embodiment of a method for generating a query result in response to receiving a user input. The workflow dashboard application 105 includes a dashboard generator 206, a stroke identifier 208, a query engine 210 and a user interface engine 212. The dashboard generator 206 creates 702 a dashboard for a collection of forms, the dashboard including a visual representation of the forms in each step of a multistep workflow. For example, the dashboard generator 206 generates a dashboard for 100 registration forms. The dashboard shows that 25 out of 100 registration forms are in the first step in the multistep workflow. The query engine 210 receives 704 a user input associated with the dashboard, the user input comprising a selection of one of the steps in the visual representation. The query engine 210 generates 706 a query of all forms corresponding to a selected step. For example, the query engine 210 receives the user's selection of the number "25" shown in the visual representation of the dashboard and generates a query for retrieving information about the forms from a database storing the 100 forms.

The query engine 210 runs 708 the query and generates 710 a query result that includes a table of the forms corresponding to the selected step. For example, the query engine 210 communicates with the stroke identifier 208 to retrieve information from 25 forms corresponding to the selected step (e.g., a position of a field, stroke data inputted in fields) and generate a table to include the information about the 25 forms. The query engine 210 instructs the user interface engine 212 to generate graphical data for displaying the user interface. The user interface engine 212 provides 712 the query result to the user in the dashboard via the communication unit 255.

Example User Interfaces

Figure 8:
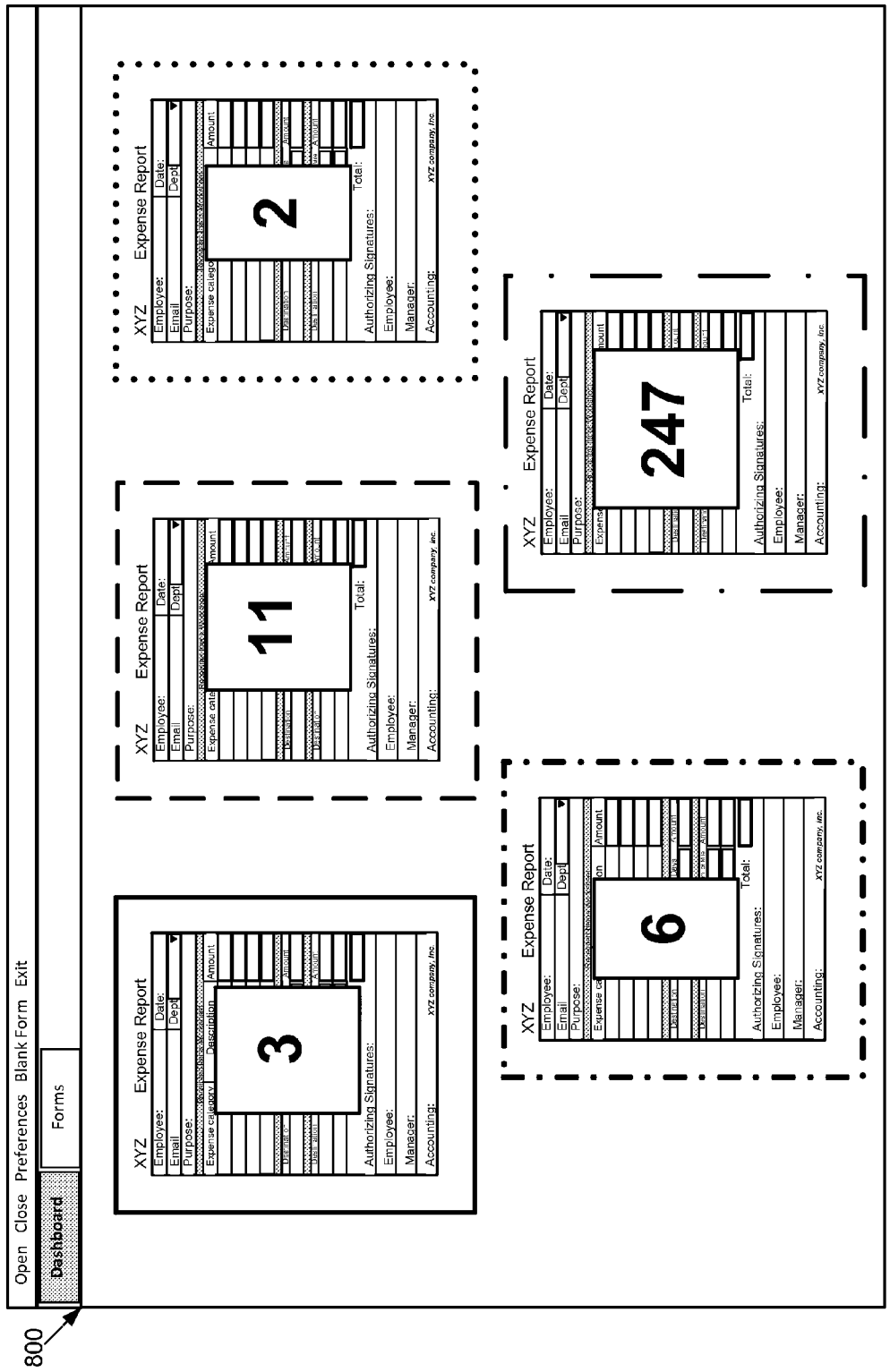
FIG. 8 is a graphic representation of an example visual representation of a dashboard.

FIG. 8 is an example of a graphic representation of a user interface 800 displayed on a user device 103 that is generated by the user interface engine 212. In this example, the user interface 800 includes a visual representation of a dashboard. The dashboard generator 206 generates the dashboard for a total of 269 expense report forms. Each form is associated with a dashboard template created by the workflow recognition tool 204. An expense report form 300 is depicted in FIG. 3 and a process of creating the dashboard template is depicted in FIG. 4. The workflow recognition tool 204 determines a five-step workflow in the dashboard template that includes: 1) an employee opened the form; 2) the employee filled in the employee portion of the form (except the signature field); 3) the employee signed the form; 4) a manager signed the manager portion of the form; and 5) a person from accounting signed the accounting portion of the form. The workflow recognition tool 204 represents the five steps with five indicators respectively. The five indicators include boxes in a solid line, a dashed line, a dotted line, a dash-dotted line and a line-dotted line. The workflow recognition tool 204 also associates the second, third, fourth and fifth steps with fields in the form 300. The workflow recognition tool 204 stores the association of five steps, fields and indicators as the dashboard template for the form 300. The dashboard generator 206 generates the dashboard shown in FIG. 8 for 269 forms based on the dashboard template.

The visual representation of the dashboard in FIG. 8 shows how many forms are currently at each step. The first box in a solid line represents the first step. The number "3" indicates that three forms have been initiated, e.g., the three forms have been opened but no fields in the three forms have been filled out or that not all of the required fields for the first step have been filled out. The second box in a dashed line represents the second step. The number "11" indicates that 11 forms have had the employee fill out employee fields except the signature field. If two fields in the form 300 are required, e.g., the employee name field and the date field those fields, are determined to be associated with the second step, the number "11" indicates that at least those two fields were filled out in these 11 forms. The third step is represented in the third box in a dotted line and the number "2" indicates that two forms have been signed by the employee. The fourth box in a dash-dotted line represents the fourth step. The number "6" indicates that six forms have been signed by the manager. The fifth submitting step is in the fifth box depicted in a line-dotted line. According to the number "247" shown in this box, 247 forms have been signed by someone in accounting after having all other required fields filled out.

FIG. 9A is a graphical representation of a user interface 900 generated by the user interface engine 212. The user interface 900 includes an example table 902 generated in response to receiving a selection of the second step in FIG. 8. The second step is the employee filling step for processing expense report forms. The query engine 210 receives a user selection for the number "11" shown in the second box in FIG. 8, and communicates with the stroke identifier 208 to generate the table 902 to include the 11 forms that are waiting for an employee signature. In one embodiment, the user selects which fields from the form that the user wants to view, for example, the date field, the email field, the dept. field and the total field. The table 902 includes 11 rows with each row representing one of the 11 forms.

Figure 9B:
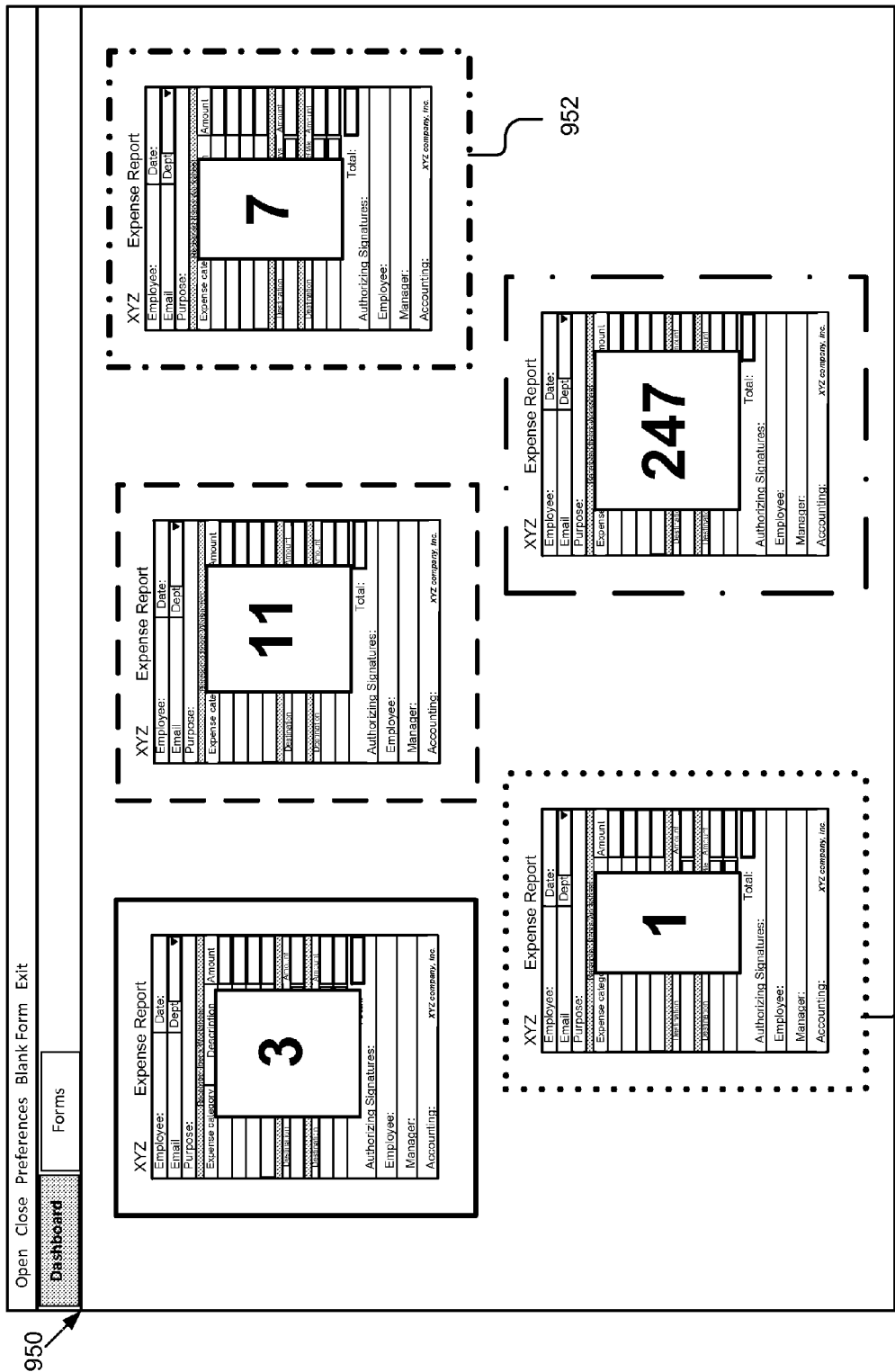
FIG. 9B is a graphic representation of an example visual representation of a dashboard modified in response to receiving user input.

FIG. 9B is a graphical representation of a user interface 950 generated by the user interface engine 212. In this example, the user interface 950 includes a visual representation of a modified dashboard generated in response to receiving user input for switching an order of the steps in FIG. 8. A user drags the third and fourth boxes in FIG. 8 to switch the order between the third step and the fourth step. The query engine 210 communicates with the dashboard generator 206 to re-categorize the eight forms included in the two categories and generate a query result to include the updated information. The query engine 210 instructs the user interface engine 212 to present the query result to the user in a modified dashboard shown in the user interface 950. The modified dashboard includes a box 952 representing the third step and a box 954 representing the fourth step. The box 952 depicted in a dash-dotted line indicates that the third step is associated with the accounting signing step. The number "7" in the box 952 shows that seven forms are waiting for the accounting signature. The box 954 depicted in a dotted line indicates that the fourth step is associated with the manager signing step. The number "1" in the box 952 shows that a form is waiting for the manager's signature.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving a collection of forms, each form in the collection being of a same type and having an association of fields and steps in each form;
   identifying, using one or more computing devices, which fields on a form of the same type have been filled in by at least one user;
   determining, using the one or more computing devices, a current step of an ordered multistep workflow for the form, by identifying a lowest ordered incomplete step in the ordered multistep workflow based on the fields of the form that have been filled in by the at least one user, and wherein each step of the ordered multistep workflow designates one or more actions to be completed upon the form of the same type and wherein the one or more actions include at least a condition that a specified field must be filled in or that an action must be performed on the form;
   including the form with other forms in the collection in a first group of a plurality of groups based on the current step, wherein each group of the plurality of groups is associated with an ordered step of the ordered multistep workflow and includes forms from the collection that have been analyzed and determined to be in a common current step of the ordered multistep workflow;
   generating, using the one or more computing devices, a dashboard including a visual representation of the plurality of groups of forms, the visual representation including an indication of a number of forms in each respective group;
   receiving a first user input for switching an order of steps in the multistep workflow; and
   responsive to the first user input, updating the dashboard by modifying the indication of the number of forms in each respective group.

2. The method of claim 1 further comprising combining at least two steps of the ordered multistep workflow into a category, and wherein the dashboard displays a number of forms that correspond to the category.

3. The method of claim 1 further comprising creating a dashboard template for the form in the collection by:
   identifying at least one field in the form that is associated with a step in the ordered multistep workflow; and
   highlighting the at least one field in the form that is associated with the step using an indicator.

4. The method of claim 3, wherein identifying which fields on the form of the same type have been filled in by the at least one user further comprises identifying which field, of the at least one field that is associated with the step in the ordered multistep workflow, has been filled in.

5. The method of claim 4, wherein determining the current step of the ordered multistep workflow for the form further comprises determining that the current step is a first step in response to identifying that a subset of the at least one field that is associated with the first step has been filled in.

6. The method of claim 4, wherein determining the current step of the ordered multistep workflow for the form further comprises determining that the current step is a next step to the first step in response to identifying that each field, of the at least one field, that is associated with the first step has been filled in.

7. The method of claim 1, wherein the indication of the number of forms in each respective group indicates how many forms are currently at each step of the ordered multistep workflow.

8. The method of claim 1, further comprising:
   generating a query based on a second user input associated with the dashboard; and
   generating a query result based on running the query.

9. The method of claim 8, wherein the second user input comprises a selection of one of the steps, and wherein the query result comprises a table of forms corresponding to the selected step.

10. The method of claim 1, further comprising:
    generating a query based on the first user input of switching the order between the steps; and
    generating a query result based on running the query, wherein the query result comprises a modified indication of the number of forms that correspond to each respective group.

11. A system comprising:
    one or more processors; and
    a dashboard generator stored on a memory and executable by the one or more processors, the dashboard generator configured to receive a collection of forms, each form in the collection being of a same type and having an association of fields and steps in each form, identify which fields on a form of the same type have been filled in by at least one user, determine a current step of an ordered multistep workflow for the form, by identifying a lowest ordered incomplete step in the ordered multistep workflow based on the fields of the form that have been filled in by the at least one user, and wherein each step of the ordered multistep workflow designates one or more actions to be completed upon the form of the same type and wherein the one or more actions include at least a condition that a specified field must be filled in or that an action must be performed on the form, include the form with other forms in the collection in a first group of a plurality of groups based on the current step, wherein each group of the plurality of groups is associated with an ordered step of the ordered multistep workflow and includes forms from the collection that have been analyzed and determined to be in a common current step of the ordered multistep workflow, generate a dashboard including a visual representation of the plurality of groups of forms, the visual representation including an indication of a number of forms in each respective group, receive user input for switching an order of steps in the multistep workflow, and, responsive to the user input, update the dashboard by modifying the indication of the number of forms in each respective group.

12. The system of claim 11, wherein the dashboard generator is configured to combine at least two steps of the ordered multistep workflow into a category and wherein the dashboard displays a number of forms that correspond to the category.

13. The system of claim 11 further comprising a workflow recognition tool, the workflow recognition tool configured to create a dashboard template for the form in the collection by:
identifying at least one field in the form that is associated with a step in the ordered multistep workflow; and
highlighting the at least one field in the form that is associated with the step using an indicator.

14. The system of claim 13, wherein identifying which fields on the form of the same type have been filled in by the at least one user further comprises identifying which field, of the at least one field that is associated with the step in the ordered multistep workflow, has been filled in.

15. The system of claim 14, wherein determining the current step of the ordered multistep workflow for the form further comprises determining that the current step is a first step in response to identifying that a subset of the at least one field that is associated with the first step has been filled in.

16. The system of claim 14, wherein determining the current step of the ordered multistep workflow for the form further comprises determining that the current step is a next step to the first step in response to identifying that each field, of the at least one field, that is associated with the first step has been filled in.

17. A computer program product comprising a non-transitory computer useable medium including a computer readable program, wherein the computer readable program when executed on a computer causes the computer to:
receive a collection of forms, each form in the collection being of a same type and having an association of fields and steps in each form;
identify which fields on a form of the same type have been filled in by at least one user;
determine a current step of an ordered multistep workflow for the form, by identifying a lowest ordered incomplete step in the ordered multistep workflow based on the fields of the form that have been filled in by the at least one user, and wherein each step of the ordered multistep workflow designates one or more actions to be completed upon the form of the same type and wherein the one or more actions include at least a condition that a specified field must be filled in or that an action must be performed on the form;
include the form with other forms in the collection in a first group of a plurality of groups based on the current step, wherein each group of the plurality of groups is associated with an ordered step of the ordered multistep workflow and includes forms from the collection that have been analyzed and determined to be in a common current step of the ordered multistep workflow;
generate a dashboard including a visual representation of the plurality of groups of forms, the visual representation including an indication of a number of forms in each respective group;
receive user input for switching an order of steps in the multistep workflow; and
responsive to the user input, update the dashboard by modifying the indication of the number of forms in each respective group.

18. The computer program product of claim 17, wherein the computer readable program when executed on the computer further causes the computer to create a dashboard template for the form in the collection.

19. The computer program product of claim 18, wherein the computer readable program when executed on the computer further causes the computer to create the dashboard template for the form in the collection by:
identifying at least one field in the form that is associated with a step in the ordered multistep workflow; and
highlighting the at least one field in the form that is associated with the step using an indicator.

20. The computer program product of claim 17, wherein the indication of the number of forms in each respective group indicates how many forms are currently at each step of the ordered multistep workflow.

* * * * *